(12) United States Patent
Cox et al.

(10) Patent No.: US 11,767,134 B2
(45) Date of Patent: Sep. 26, 2023

(54) POWER-ENHANCED SLEW MANEUVERS (71) Applicant: Space Dynamics Laboratory, North Logan, UT (US)

(72) Inventors: Skylar Cox, North Logan, UT (US); Tyson Smith, Logan, UT (US); Tanner Lex Jones, Logan, UT (US)

(*) Notice: Subject to any disclaimer, the term of this patent is extended or adjusted under 35 U.S.C. 154(b) by 93 days.

(21) Appl. No.: 17/389,246

(22) Filed: Jul. 29, 2021

(65) Prior Publication Data

US 2022/0033109 A1 Feb. 3, 2022

Related U.S. Application Data (60) Provisional application No. 63/059,073, filed on Jul. 30, 2020.

(51) Int. Cl.
*B64G 1/24* (2006.01)

(52) U.S. Cl.
CPC ............ *B64G 1/242* (2013.01); *B64G 1/244* (2019.05); *B64G 2001/247* (2013.01)

(58) Field of Classification Search
CPC ... B64G 1/00; B64G 1/22; B64G 1/24; B64G 1/242; B64G 1/244; B64G 1/428; B64G 1/28; B64G 1/283; B64G 1/42; B64G 1/425; B64G 1/44; B64G 2001/247
USPC .......................................................... 701/13
See application file for complete search history.

(56) References Cited

U.S. PATENT DOCUMENTS

2019/0286168 A1\* 9/2019 Weiss ....................... B64G 1/26
2022/0097872 A1\* 3/2022 Sternheim ................ B64G 1/10

OTHER PUBLICATIONS

Cox et al., "Resource-constrained constellation scheduling for rendezvous and servicing operations," Journal of Guidance, Control, and Dynamics, vol. 45, No. 7, Mar. 2022, pp. 1-11.
Cox et al., "Constellation Planning Methods for Sequential Spacecraft Rendezvous Using Multi-Agent Scheduling," in Astrodynamics Specialist Conference. AAS/AIAA, 2019, pp. 1-12.
Cox et al.,"A Network Flow Approach to Constellation Planning," Space Mission Planning & Operations, May 13, 2022, pp. 1-23.
Cox et al., "A Two-layer Constellation Scheduling Approach for Imaging and Communications," in Proceedings of the Astrodynamics Specialist Conference. AAS/AIAA, 2022, pp. 1-20.
Smith et al., "Spacecraft Formation Flying Control Switching Surface Based on Relative Orbital Elements," in Proceedings of the Astrodynamics Specialist Conference. AAS/AIAA, 2022, pp. 1-19.
Cox, et al., Power-Optimal Slew Maneuvers in Support of Small Satellite Earth Imaging Missions (Paper), 34th Annual Small Satellite Conference, Aug. 2020, Utah State University, Logan, Utah.
Cox, et al., Power-Optimal Slew Maneuvers in Support of Small Satellite Earth Imaging Missions (Poster), 34th Annual Small Satellite Conference, Aug. 2020, Utah State University, Logan, Utah.

\* cited by examiner

*Primary Examiner* — Khoi H Tran
*Assistant Examiner* — Sarah A Tran (57) ABSTRACT

For power-enhanced slew maneuvers, a method determines a power collection function for a satellite. The method determines a power cost function for the satellite. The method calculates a power enhanced slew maneuver based on the power collection function and the power cost function.

15 Claims, 12 Drawing Sheets

| Maximum Angular Acceleration 201 |
| Maximum Angular Velocity 203 |
| Orbital Data 205 |
| Solar Data 207 |
| Power Collection Function 211 |
| Power Cost Function 213 |
| Battery Charge 219 |
| Power Collected 221 |
| Power Use 223 |
| Satellite Orientation 225 |
| Reaction Wheel Power Consumption 227 |
| Cost Function 229 |
| Mission Objective 231 |

POWER-ENHANCED SLEW MANEUVERS

CROSS-REFERENCE TO RELATED APPLICATIONS

This application claims priority to U.S. Provisional Patent Application 63/059,073 entitled "POWER-ENHANCED SLEW MANEUVERS" and filed on Jul. 30, 2020 for Skylar Cox which is incorporated herein by reference.

FIELD

The subject matter disclosed herein relates to slew maneuvers and more particularly relates to power-enhanced slew maneuvers.

BACKGROUND

Description of the Related Art

Satellites are often oriented or slewed in orbit.

BRIEF SUMMARY

A method of power-enhanced slew maneuvers is disclosed. The method determines a power collection function for a satellite. The method determines a power cost function for the satellite. The method calculates a power enhanced slew maneuver based on the power collection function and the power cost function.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing computer readable code. The storage devices may be tangible, non-transitory, and/or non-transmission.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in computer readable code and/or software for execution by various types of processors. An identified module of computer readable code may, for instance, comprise one or more physical or logical blocks of executable code which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of computer readable code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different computer readable storage devices, and may exist, at least partially, merely as electronic signals on a system or network. Where a module or portions of a module are implemented in software, the software portions are stored on one or more computer readable storage devices.

Any combination of one or more computer readable medium may be utilized. The computer readable medium may be a computer readable signal medium or a computer readable storage medium. The computer readable storage medium may be a storage device storing the computer readable code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable code embodied therein, for example, in baseband or as part of a carrier wave. Such a propagated signal may take any of a variety of forms, including, but not limited to, electro-magnetic, optical, or any suitable combination thereof. A computer readable signal medium may be any storage device that is not a computer readable storage medium and that can communicate, propagate, or transport a program for use by or in connection with an instruction execution system, apparatus, or device. Computer readable code embodied on a storage device may be transmitted using any appropriate medium, including but not limited to wireless, wire line, optical fiber cable, Radio Frequency (RF), etc., or any suitable combination of the foregoing.

Computer readable code for carrying out operations for embodiments may be written in any combination of one or more programming languages, including an object oriented programming language such as Python, Ruby, R, Java, Java Script, Smalltalk, C++, C sharp, Lisp, Clojure, PHP, or the like and conventional procedural programming languages, such as the "C" programming language or similar programming languages. The computer readable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise. The term "and/or" indicates embodiments of one or more of the listed elements, with "A and/or B" indicating embodiments of element A alone, element B alone, or elements A and B taken together.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The embodiments may transmit data between electronic devices. The embodiments may further convert the data from a first format to a second format, including converting the data from a non-standard format to a standard format and/or converting the data from the standard format to a non-standard format. The embodiments may modify, update, and/or process the data. The embodiments may store the received, converted, modified, updated, and/or processed data. The embodiments may provide remote access to the data including the updated data. The embodiments may make the data and/or updated data available in real time. The embodiments may generate and transmit a message based on the data and/or updated data in real time.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by computer readable code. These computer readable code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The computer readable code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable code.

Cox, Skylar et al., "Power-Optimal Slew Maneuvers in Support of Small Satellite Earth Imaging Missions" is incorporated herein by reference.

The description of elements in each figure may refer to elements of proceeding figures. Like numbers refer to like elements in all figures, including alternate embodiments of like elements.

Figure 1A:
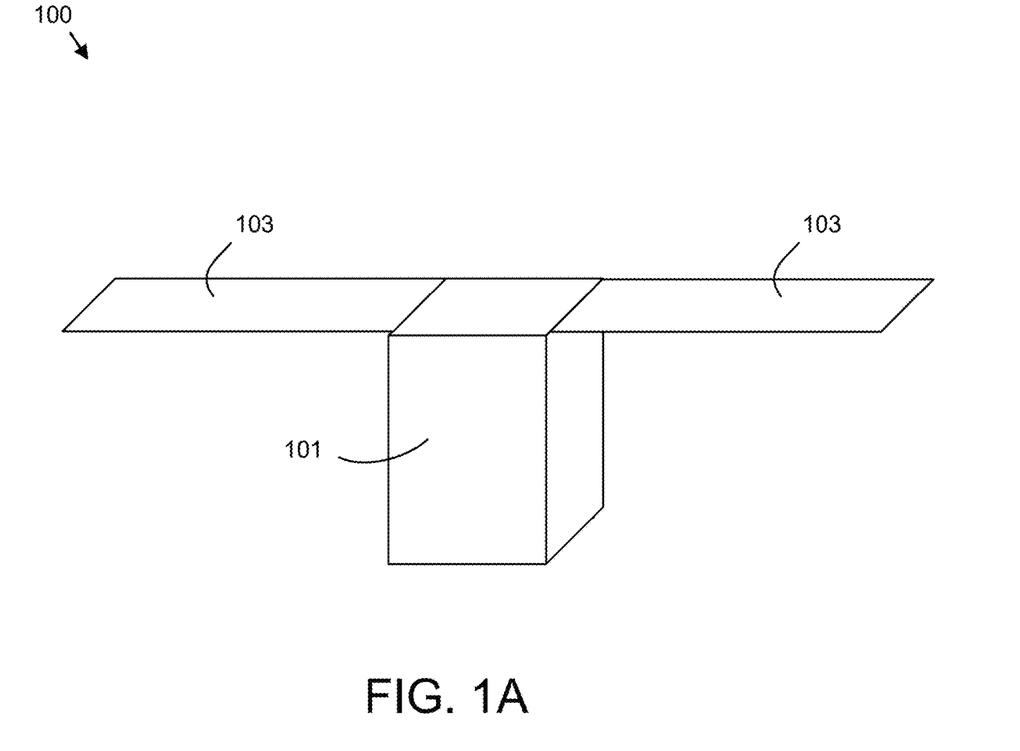
FIG. 1A is a perspective drawing illustrating one embodiment of a satellite.

FIG. 1A is a perspective drawing illustrating one embodiment of a satellite 100. In the depicted embodiment, the satellite 100 includes a body 101 and solar arrays 103. The solar arrays 103 collect solar energy that may power the satellite 100. In one embodiment, the solar arrays 103 are not articulated. As a result, the orientation of the solar arrays 103 depends upon the orientation of the satellite 100.

The embodiments maximize satellite battery state of charge while also ensuring mission pointing is executed within required constraints. By controlling reaction wheel accelerations and orienting solar arrays during slew maneuvers, opportunities for both image collection and power collection and consumption are considered. The embodiments reduce the need for operator decisions by integrating power collection with imaging tasks, thus interleaving autonomous sun-bathing operations with planned imaging events.

Given physical properties of the satellite 100 (e.g., solar panel orientation and size, inertia properties, ADCS capabilities, etc.), the embodiments generate a power-optimal slew trajectory. It accomplishes this by minimizing a cost function where the energy expenditure forms a base cost and power collected is subtracted from that as will be described hereafter.

Figure 1B:
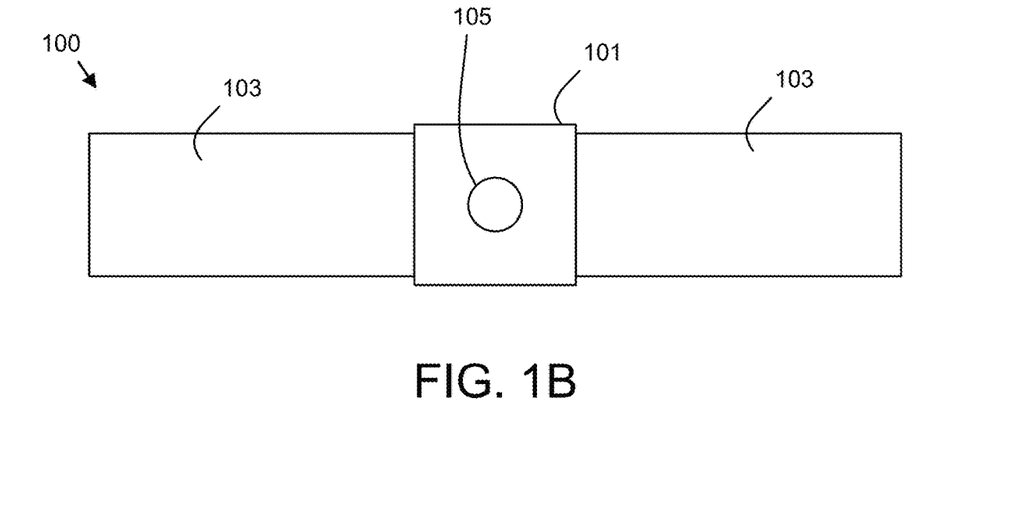
FIG. 1B is a front view drawing illustrating one embodiment of a satellite.

FIG. 1B is a front view drawing illustrating one embodiment of the satellite 100. In the depicted embodiment, a sensor 105 is shown. The sensor 105 may be oriented towards one or more targets such as objects on a planet below, astronomical objects, and the like. In one embodiment, the satellite 100 is oriented or slewed to direct the sensor 105 towards the target. Thus, the orientation of the solar arrays 103 depends upon orientation changes between targets.

Figure 1C:
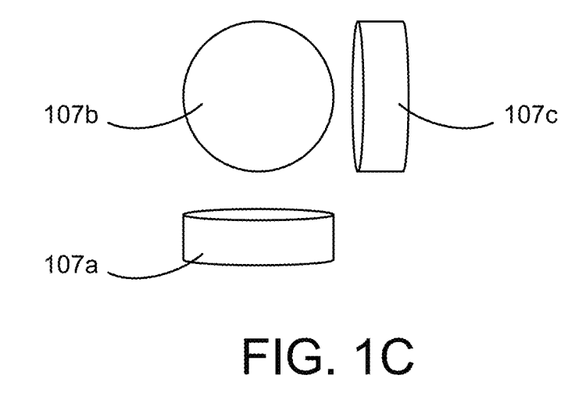
FIG. 1C is a perspective drawing illustrating one embodiment of a reaction wheels.

FIG. 1C is a perspective drawing illustrating one embodiment of a reaction wheels 107a-c. The reaction wheels 107 may slew the satellite 100 about one or more corresponding axes of the satellite 100.

Figure 1D:
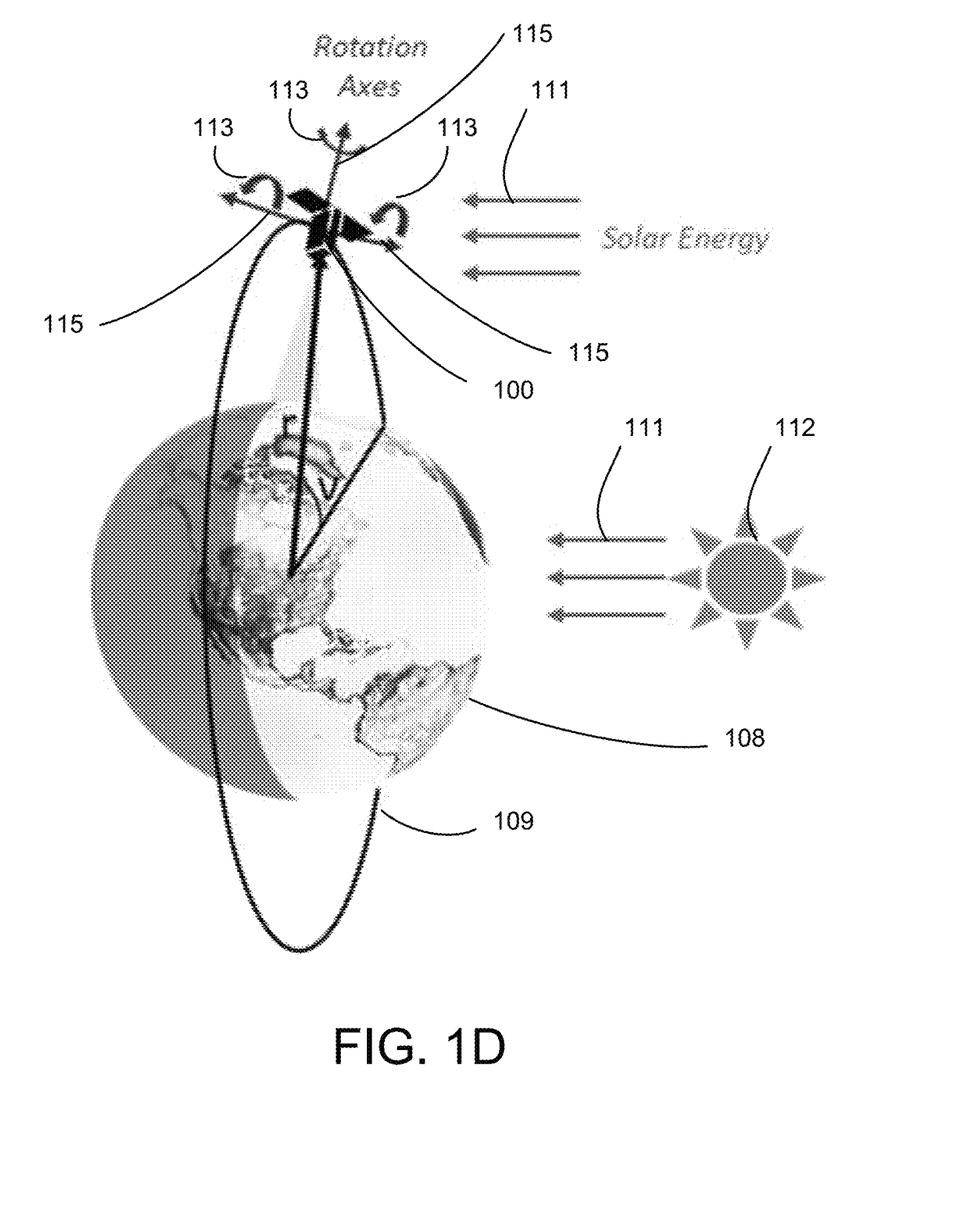
FIG. 1D is a perspective drawing illustrating one embodiment of a satellite in orbit.

FIG. 1D is a perspective drawing illustrating one embodiment of a satellite 100 in orbit 109. In the depicted embodiment, the satellite 100 is in an orbit about a body 108 such as the earth. The reaction wheels 107 may slew 113 the satellite 100 about one or more axes 115. The reaction wheels 107 slew 113 the satellite 100 to orient the sensor 105. A combination of slews 113 may comprise a slew maneuver. The reaction wheels 107 may also slew 113 the satellite 100 to capture solar energy 111 from the sun 112 with the solar arrays 103.

The embodiments calculate a power enhanced slew maneuver that improves the collection of solar energy 111 by the solar arrays 103 including while orienting the sensor 105 to capture images. Small satellite sensor collection missions typically rely on commercial, off-the-shelf products with control systems that use established methods for managing satellite attitude operations. These methods simply move the satellite 100 between commanded orientations without considering solar exposure. In particular, performing a specified slew based on traditional methods may keep solar arrays 103 in shadow, draining the satellite's power.

To compensate, satellite operation teams often command the satellite 100 to enter a "sunbathe" state between collections. This additional level of complexity requires manual or rigidly prescribed specification of the frequency and duration of the "sunbathe" operation. However, there is opportunity for power collection during movement if satellite slews are controlled to optimize solar exposure in combination with control input. The embodiments perform slew maneuvering to optimize a satellite power state. By controlling reaction wheel accelerations and orienting solar arrays 103 during slew maneuvers, opportunities for both image collection and power collection and consumption are considered.

The embodiments reduce the need for operator decisions by integrating power collection with imaging tasks. This approach first prioritizes several image collection targets using an image collection score and slew cost in discretized time to generate a directed acyclic graph. The optimal collection path through the graph is then computed to generate a representative slew plan for power state optimal control. In simulation of several scenarios, satellite behavior reflected power-prioritized objectives while achieving collection requirements. The embodiments improve collection performance while ensuring a more power-positive state for the satellite 100 but required greater maximum power input and greater overall computational cost. The embodiments improve the power efficiency of small satellite earth imaging missions that are often power constrained due to non-articulated solar arrays and relatively small power storage capacity.

Figure 2:
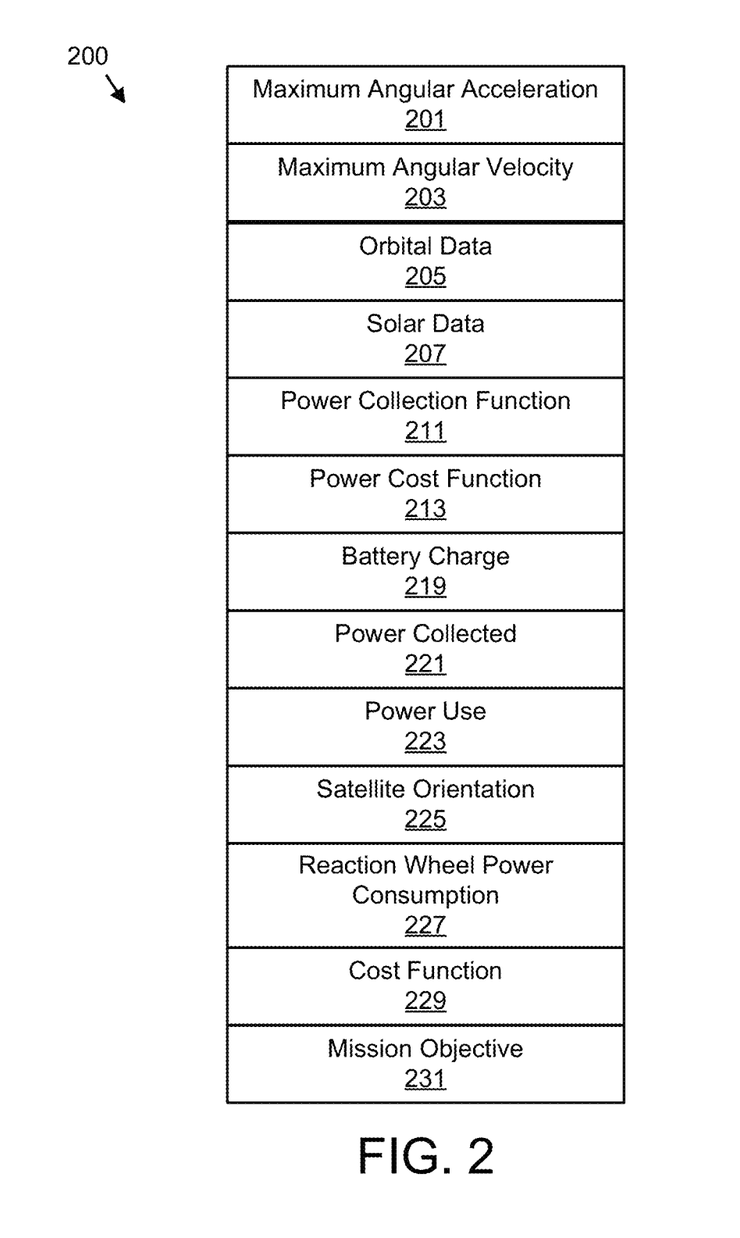
FIG. 2 is a schematic block diagram illustrating one embodiment of slew data.

FIG. 2 is a schematic block diagram illustrating one embodiment of slew data 200. The slew data 200 may be used to calculate a power enhanced slew maneuver. The slew data 200 may be organized as a data structure in a memory. In the depicted embodiment, the slew data 200 includes a maximum angular acceleration 201, a maximum angular velocity 203, orbital data 205, solar data 207, a power collection function 211, a power cost function 213, a battery charge 219, power collected 221, power use 223, satellite orientation 225, reaction wheel power consumption 227, and a cost function 229.

The maximum angular acceleration 201 may be a limit on the angular acceleration allowed for the reaction wheels 107 to slew 113 the satellite 100. In addition, the maximum angular acceleration 201 may be a physical maximum that the reaction wheels 107 slew 113 the satellite 100. The maximum angular acceleration 201 may prevent reaction wheel saturation.

The maximum angular velocity 203 may be a limit on the angular velocity allowed for the reaction wheels 107 to slew 113 the satellite 100. In addition, the maximum angular velocity 203 may be a physical maximum that the reaction wheels 107 slew 113 the satellite 100. The maximum angular velocity 203 may prevent reaction wheel saturation.

The orbital data 205 may specify the orbit 109 and orbital dynamics of the satellite 100. The solar data 207 may specify positions of the sun 112 and/or positions of the sun 112 relative to the orbit of the satellite 100.

The battery charge 219 may specify a charge of a battery for the satellite 100. The power collected 221 may specify power collected by the solar arrays 103. The power use 223 may specify the power consumed by the satellite 100.

The satellite orientation 225 may specify the orientation of the satellite 100 about the axes 115. The satellite orientation 225 may include one or more angles θ about the axes 115, one or more angular velocities ω, and one or more angular accelerations α. The reaction wheel power consumption 227 may specify the power consumed by the reaction wheels 107.

The mission objective 227 may comprise one or more satellite orientations 225 and specified positions in the orbit 109. For example, the mission objective 227 may specify satellite orientations 225 for capturing images at the specified positions.

The power collection function 211 may be a function of power collected 221 for each satellite orientation 225. The power collection function 211 may be based on Equations 1 and 2, where $P_b(t)$ is a battery charge 219 at time t, $P_c(\tau)$ is an instantaneous power collected 221 by the solar arrays 103, τ is an integration variable for total net power from an initial time $t_0$ to a current time, $C_{a_w}$ is reaction wheel power consumption 227, and $P_u(\tau)$ is the nominal power use 213 by the satellite 100.

$$P_b(t) = P_b(t_0) + \int_{t_0}^{t} (P_c(\tau) - P_u(\tau)) d\tau \qquad \text{Equation 1}$$

$$P_u = C_{a_w} + P_n \qquad \text{Equation 2}$$

The power cost function 213 may calculate the electrical energy consumed by the reaction wheels 107 while slewing 113 the satellite. The power cost function 213 may be expressed by Equation 3 where p(t)dt is reaction wheel power consumption 227 for time t.

$$C_{a_w} = \Sigma_{t_0}^{t_f} p(t) dt \qquad \text{Equation 3}$$

In a certain embodiment, the power cost function 213 may be based on Equations 4-7, where x, A, and B are frames wherein the satellite slews 113 from A to B.

$$x'_{k+1} = \overline{A} x'_k + \overline{B} u_k \qquad \text{Equation 4}$$

$$\overline{A} = e^{Adt} \qquad \text{Equation 5}$$

$$\overline{B} = \int_0^{dt} e^{A(dt-\tau)} d\tau B \qquad \text{Equation 6}$$

$$x_{4_{k+1}} = x_{4_k} + dt \sqrt{\frac{\mu}{r^3}} \qquad \text{Equation 7}$$

The cost function 229 is based on the power collection function 211 and the power cost function 213. The cost function $J_i(x_N)$ 229 may be embodied in Equation 8, where $P_{b_N}$ is battery charge 219, $C_p$ is a nonzero weighting factor for the battery charge 219, $C_\theta$ is power collected 221, and $\theta_d$ is a satellite orientation 225.

$$J_i(x_N) = -C_p P_{b_N} + C_\theta (x_{2_N} - \theta_d)^2 \qquad \text{Equation 8}$$

The cost function 229 may satisfy the mission objective 231. In one embodiment, Equation 8 is for $x_k$ k=1 to N, $u_k$ k=0 to N−1, subject to subject to $$x_{k+1} = \overline{A} x_k + \overline{B} u_k \text{ and } x_{4_{k+1}} = x_{4_k} + dt \frac{\overline{u}}{r^2}.$$

Figure 3:
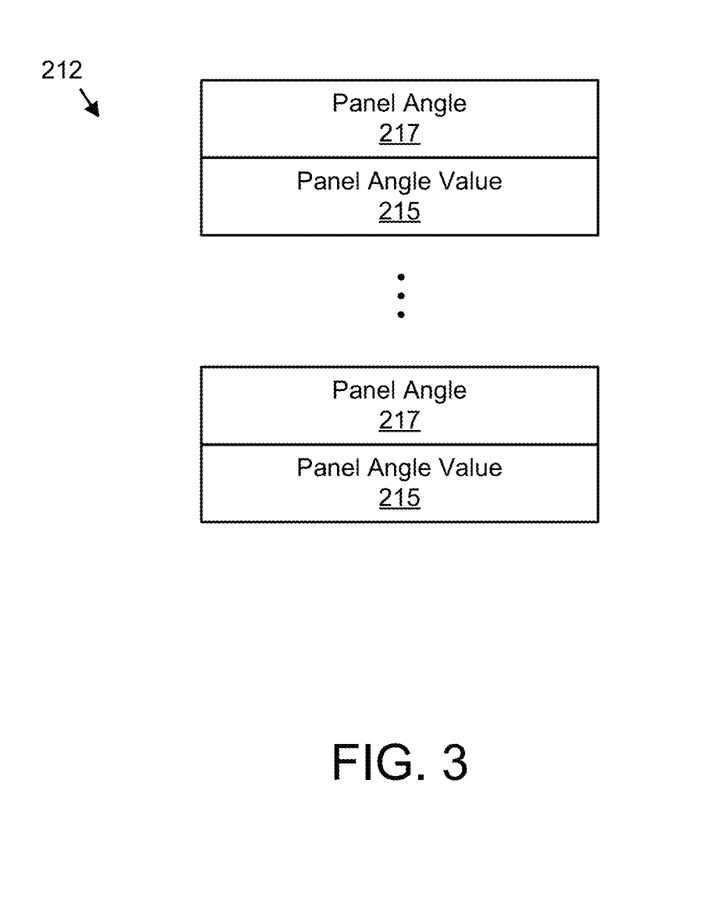
FIG. 3 is a schematic block diagram illustrating one embodiment of panel data.

FIG. 3 is a schematic block diagram illustrating one embodiment of panel data 212. The panel data 212 may be employed to extract panel angle values 215 from panel angles 217 for the solar arrays 103. The panel data 212 may be organized as a data structure in a memory. The panel data 212 may record a plurality of panel angles 217. Panel angle values 215 may be calculated, derived, and/or estimated from the panel angles 217.

Figure 4:
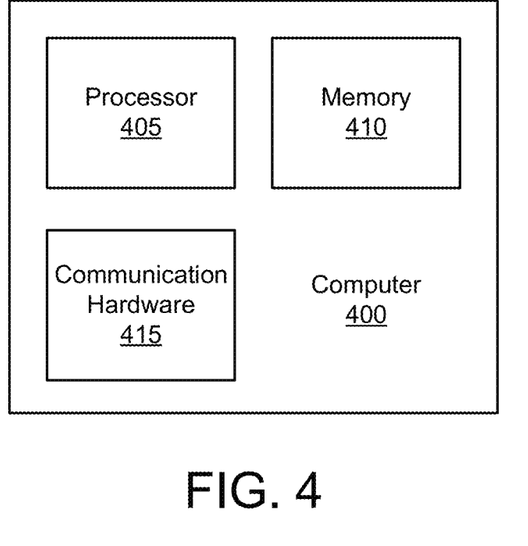
FIG. 4 is a schematic block diagram illustrating one embodiment of a computer.

FIG. 4 is a schematic block diagram illustrating one embodiment of a computer 400. The computer 400 may calculate the power enhanced slew maneuver. The computer 400 may be embodied in the satellite 100. In addition, the computer 400 may be in remote communication with the satellite 100. In the depicted embodiment, the computer 400 includes a processor 405, a memory 410, and communication hardware 415. The memory 410 may store code. The processor 405 may execute the code. The communication hardware 415 may communicate with other devices.

Figure 5:
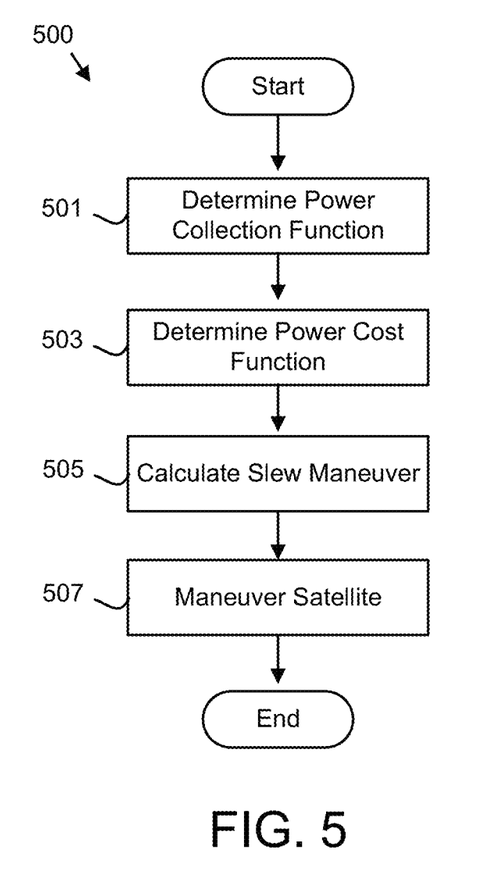
FIG. 5 is a schematic flow chart diagram illustrating one embodiment of a satellite maneuver method.
Figure 6A:
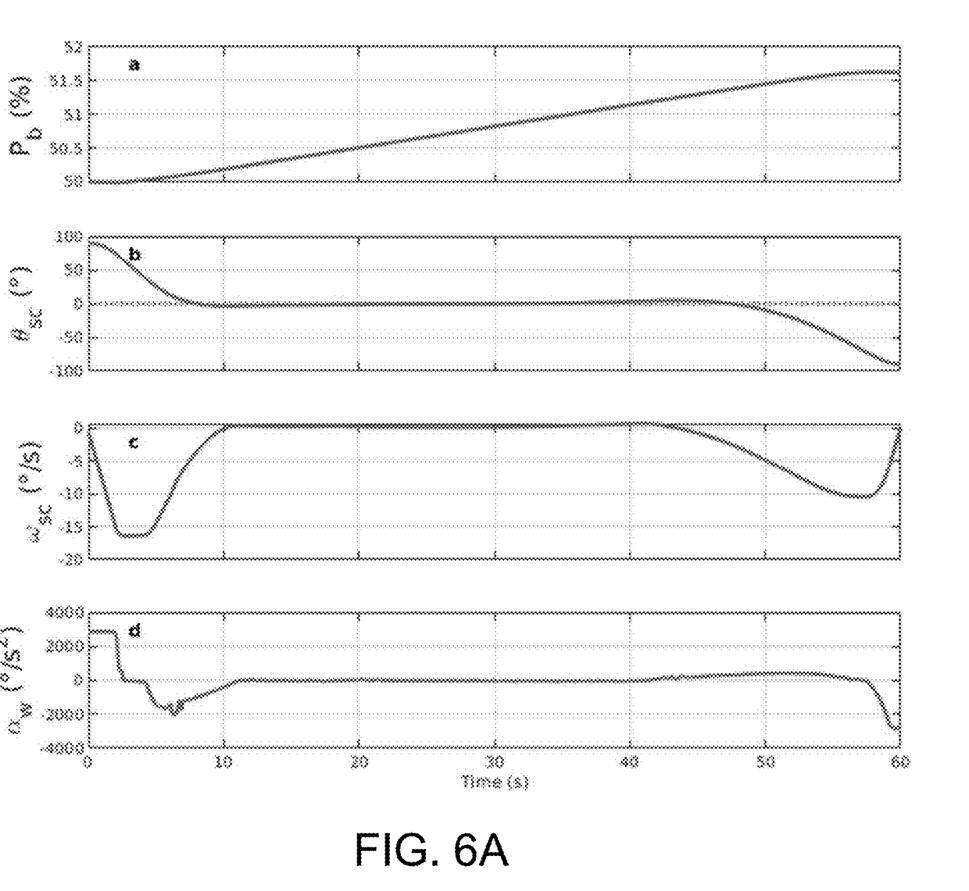
FIGS. 6A-D is graphs illustrating embodiments of a slew maneuvers.
Figure 6B:
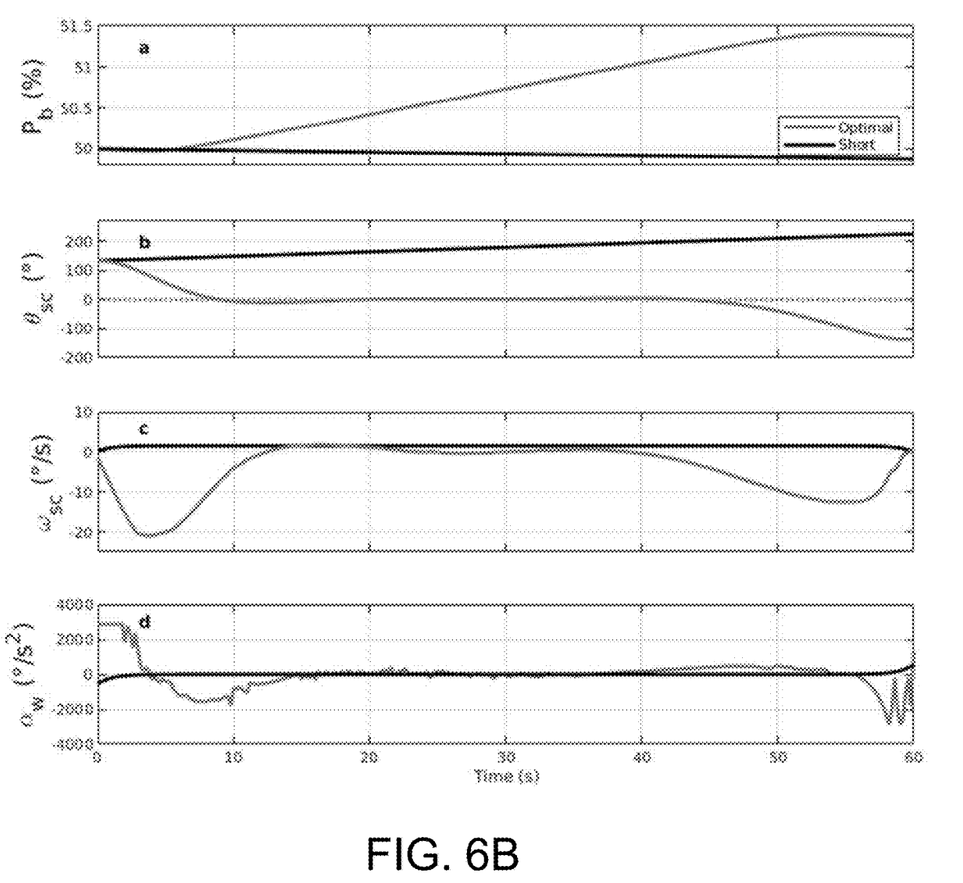
Figure 6C:
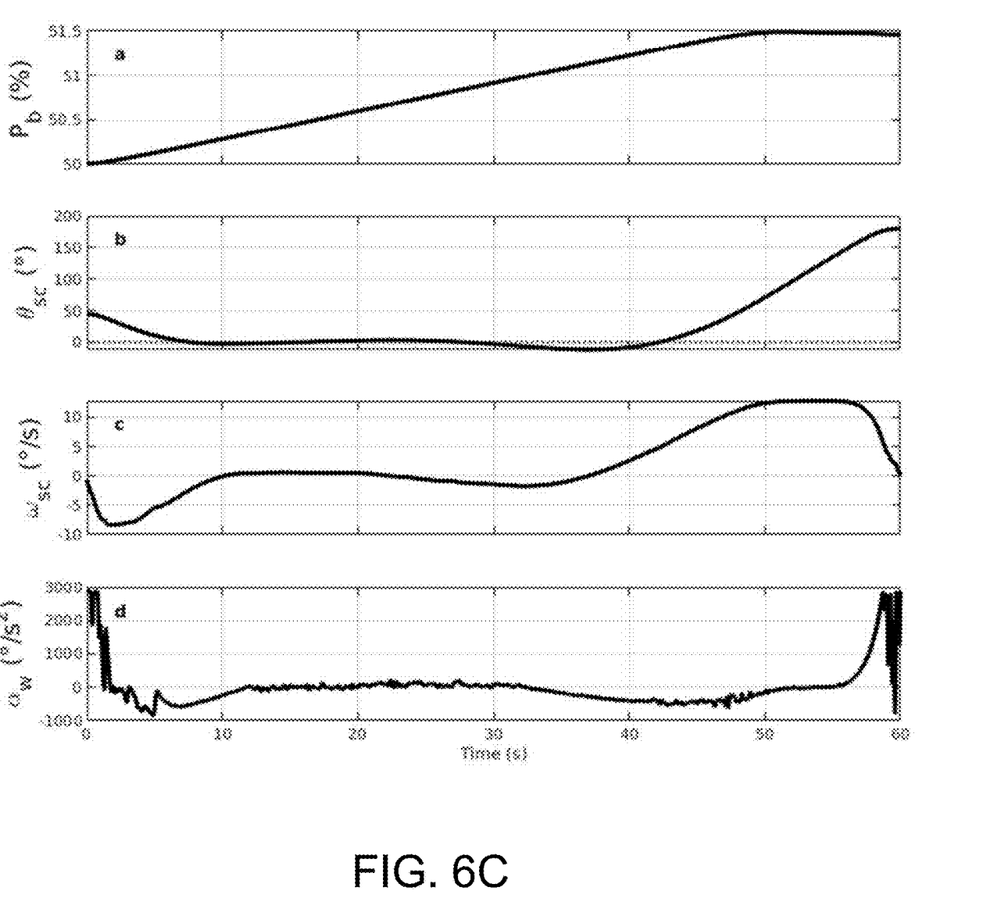
Figure 6D:
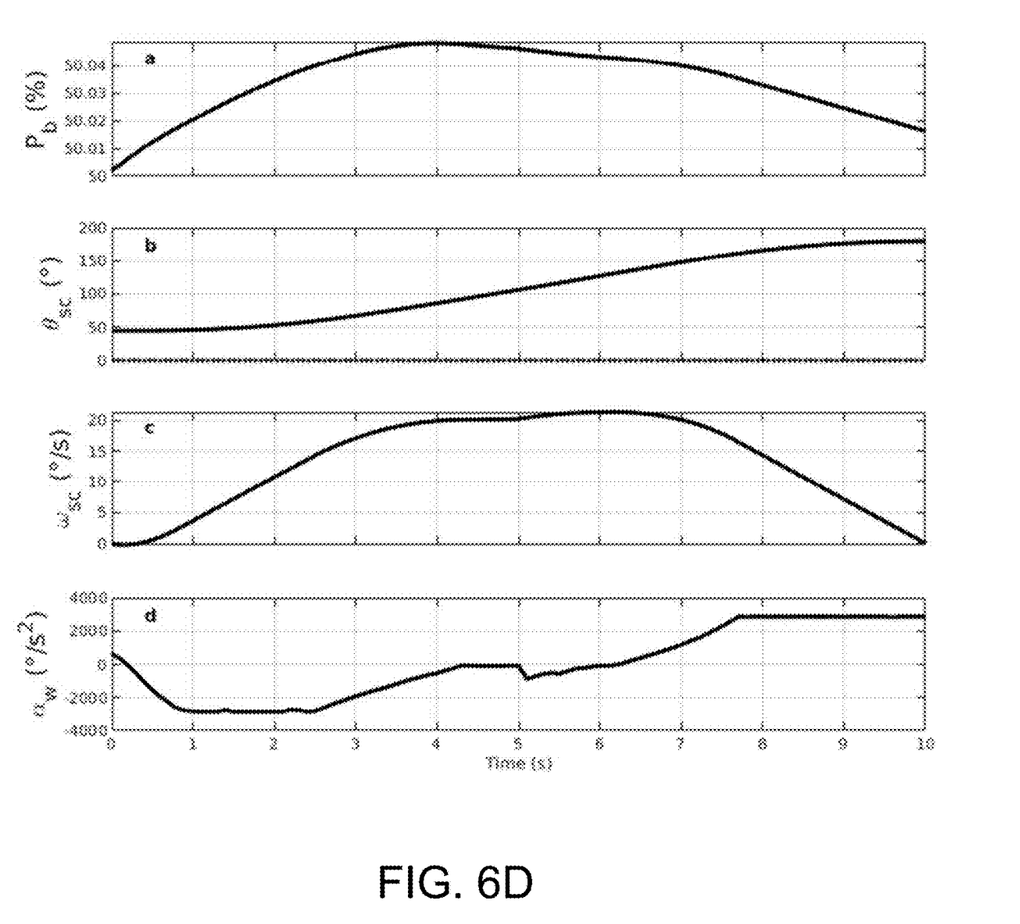

FIG. 5 is a schematic flow chart diagram illustrating one embodiment of a satellite maneuver method 500. The method 500 may calculate the power enhanced slew maneuver. In addition, the method 500 may maneuver the satellite 100 based on the power enhanced slew maneuver. The method 500 may be performed by the processor 405.

The method 500 starts, and in one embodiment, the processor 405 determines 501 the power collection function 211 for the satellite 100. The processor 405 may employ Equations 1-2 and/or Equation 8.

In one embodiment, determining 501 the power collection function 211 includes creating a plurality of panel records 212, adding panel angles 217, and adding panel angle values 215.

The processor 405 further determines 503 the power cost function 213 for the satellite 100. The processor 405 may employ Equation 3. In addition, the processor 405 may employ Equations 4-7.

The processor 405 may calculate 505 the power enhanced slew maneuver based on the collection function 211 and the power cost function 213. The power enhanced slew maneuver may minimize the cost function 229.

The processor 405 may maneuver 507 the satellite 100 with the power enhanced slew maneuver and the method 500 ends.

Figure 7:
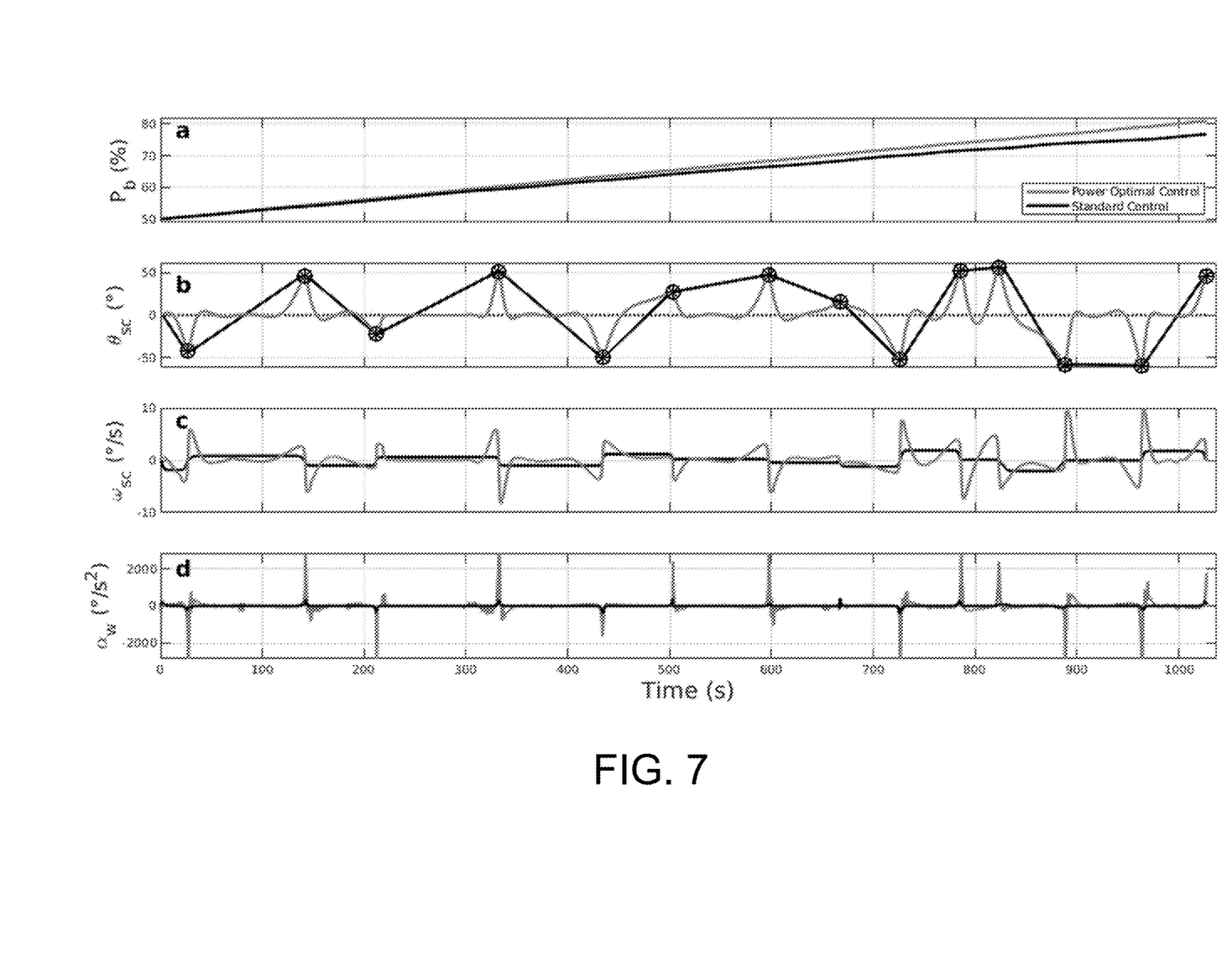
FIG. 7 is graphs illustrating embodiments of a slew maneuvers.

FIGS. 6A-D is graphs illustrating embodiments of a slew maneuvers. FIG. 7 is graphs illustrating embodiments of a slew maneuvers. Battery charge $P_b$ 219, an angle θ of the satellite orientation 225, an angular velocity ω of the satellite orientation 225, and an acceleration a of the satellite orientation 225.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   determining, by use of a processor, a power collection function for a satellite;
   determining a power cost function $C_{a_w}$ for the satellite as $C_{a_w} = \Sigma_{t_0}^{t_f} p(t) dt$ wherein p(t) is a reaction wheel consumption for time t the satellite slews from a first frame $t_0$ to a second frame t;
   determining a cost function $J_i(x_N)$ from the power collection function and the power cost function as $J_i(x_N) = -C_p P_{b_N} + C_\theta (x_{2_N} - \theta_d)^2$ wherein $P_{b_N}$ is battery charge, $C_p$ is a nonzero weighting factor for the battery charge, $C_\theta$ is power collected, x is a satellite position, and $\theta_d$ is a satellite orientation;

calculating a power enhanced slew maneuver by minimizing the cost function subject to the power collection function and the power cost function; and maneuvering the satellite with the power enhanced slew maneuver.

2. The method of claim 1, wherein the power collection function is a function of power collected for each satellite orientation.

3. The method of claim 1, wherein the power cost function is a function of reaction wheel power consumption.

4. The method of claim 1, wherein the cost function satisfies a mission objective.

5. The method of claim 1, wherein the power collection is $P_b(t)=P_b(t_0)\int_{t_0}^t (P_c(\tau)-P_u(\tau))d\tau$ where $P_b(t)$ is a battery charge at time t, $P_c(\tau)$ is an instantaneous power collected by solar arrays, $\tau$ is an integration variable for total net power from an initial time $t_0$ to a current time.

6. An apparatus comprising:
a processor executing code stored in a memory to perform:
determining a power collection function for a satellite;
determining a power cost function C for the satellite as $C_{\alpha_w}$ for the satellite as $C_{\alpha_w}=\Sigma_{t_0}^t p(t)dt$ wherein p(t) is a reaction wheel consumption for time t the satellite slews from a first frame $t_0$ to a second frame t;
determining a cost function $J_i(x_N)$ from the power collection function and the power cost function as $J_i(x_N)=-C_p P_{b_N}+C_\theta(x_{2_N}-\theta_d)^2$ wherein $P_{b_N}$ is battery charge, $C_p$ is a nonzero weighting factor for the battery charge, $C_\theta$ is power collected, x is a satellite position, and $\theta_d$ is a satellite orientation;
calculating a power enhanced slew maneuver by minimizing the cost function subject to the power collection function and the power cost function; and
maneuvering the satellite with the power enhanced slew maneuver.

7. The apparatus of claim 6, wherein the power collection function is a function of power collected for each satellite orientation.

8. The apparatus of claim 6, wherein the power cost function is a function of reaction wheel power consumption.

9. The apparatus of claim 6, wherein the cost function satisfies a mission objective.

10. The apparatus of claim 6, wherein the power collection is $P_b(t)=P_b(t_0)\int_{t_0}^t (P_c(\tau)-P_u(\tau))d\tau$ where $P_b(t)$ is a battery charge at time t, $P_c(\tau)$ is an instantaneous power collected by solar arrays, $\tau$ is an integration variable for total net power from an initial time $t_0$ to a current time.

11. A program product comprising a non-transitory computer readable storage medium that stores code executable by a processor, the executable code comprising code to perform:
determining a power collection function for a satellite;
determining a power cost function $C_{\alpha_w}$ for the satellite as $C_{\alpha_w}=\Sigma_{t_0}^t p(t)dt$ wherein p(t) is a reaction wheel consumption for time t the satellite slews from a first frame $t_0$ to a second frame t;
determining a cost function $J_i(x_N)$ from the power collection function and the power cost function as $J_i(x_N)=-C_p P_{b_N}+C_\theta(x_{2_N}-\theta_d)^2$ wherein $P_{b_N}$ is battery charge, $C_p$ is a nonzero weighting factor for the battery charge, $C_\theta$ is power collected, x is a satellite position, and $\theta_d$ is a satellite orientation;
calculating a power enhanced slew maneuver by minimizing the cost function subject to the power collection function and the power cost function; and
maneuvering the satellite with the power enhanced slew maneuver.

12. The program product of claim 11, wherein the power collection function is a function of power collected for each satellite orientation.

13. The program product of claim 11, wherein the power cost function is a function of reaction wheel power consumption.

14. The program product of claim 11, wherein the cost function satisfies a mission objective.

15. The program product of claim 11, wherein the power collection is $P_b(t)=P_b(t_0)\int_{t_0}^t (P_c(\tau)-P_u(\tau))d\tau$ where $P_b(t)$ is a battery charge at time t, $P_c(\tau)$ is an instantaneous power collected by solar arrays, $\tau$ is an integration variable for total net power from an initial time $t_0$ to a current time.

* * * * *